Aug. 10, 1965   R. E. BLOOM ETAL   3,200,331
RF BOLOMETER BRIDGE MEASURING CIRCUIT USING
SUBSTITUTIONAL BRIDGE BALANCE METHOD
Filed Aug. 1, 1961   2 Sheets-Sheet 1

INVENTORS
ROBERT E. BLOOM
ROBERT J. FLEISCHER
BY
*Harry R. Lubcke*
AGENT

Aug. 10, 1965

R. E. BLOOM ETAL 3,200,331

RF BOLOMETER BRIDGE MEASURING CIRCUIT USING
SUBSTITUTIONAL BRIDGE BALANCE METHOD

Filed Aug. 1, 1961

INVENTORS
ROBERT E. BLOOM
ROBERT J. FLEISCHER

BY

*Harry R. Lubcke*

AGENT 3,200,331
RF BOLOMETER BRIDGE MEASURING CIRCUIT USING SUBSTITUTIONAL BRIDGE BALANCE METHOD
Robert E. Bloom, Sepulveda, and Robert J. Fleischer, Los Angeles, Calif., assignors to Stoddart Aircraft Radio Co., Inc., Los Angeles, Calif., a corporation of California
Filed Aug. 1, 1961, Ser. No. 128,540
8 Claims. (Cl. 324—106)

Our invention relates to a bridge circuit for accurately measuring low power levels of radio frequency alternating current electrical energy at any frequency within a very wide frequency range.

There has existed a long-standing requirement for a method and means for measuring low levels of radio frequency power over a wide frequency range in radio receiver practice for calibrating signal generators and thus for subsequently calibrating field-strength meters and similar apparatus.

While the art has provided power-measuring circuitry of this kind in the past, the precision of the best prior techniques has been seriously inferior to the precision of most other electrical measurements. The frequency range over which measurements could be made has been restricted by what the art has regarded as fundamental limitations. The range of power levels over which measurements could be made has also been restricted, particularly at the low power level end of the range.

We have extended each of these limitations by orders of magnitude by employing a new technique.

A dual (twin) bolometer circuit is provided in a new mount which has relatively very low capacitative reactance for radio frequency bypass. The mount is, furthermore, constructed to largely eliminate inductive reactance and so to avoid disturbing resonances within the frequency range of operation. Such spurious resonances have been very much a part of prior art techniques, although unwanted, and have required that measurements be avoided at and near the frequencies of such resonances. In addition, it has been necessary to periodically check the location of these resonances to insure that the frequency thereof had not shifted because of secondary influences and that resonances would, therefore, be avoided.

Our extremely wide frequency range of operation has been made possible by a novel switching arrangement. Therewith we have been able to retain the desirable accuracy of the alternating current method for substitutionally balancing the bolometer bridge circuit and still not shunt out the audio frequency energy by large by-pass capacitors as are required to provide operation at low radio frequencies.

Contrary to any teaching of the prior art, this circuit condition is accomplished by a ganged switching arrangement which removes the large bypass capacitors from the bolometer arm of the bridge when the alternating current (audio) generator is connected for substitutional balancing. In fact, the large bypass capacitors are connected to the bridge circuit only when what we term "low radio frequencies" are applied to the bridge and these may have a frequency lower than the "audio" frequency that is employed for substitutional balancing.

We employ an accurately constant voltage source as the basic D.C. energizing means for the bridge. The prior art has often employed a constant current source, or has made some arrangement of reduced accuracy for indicating the radio frequency power by a meter indication rather than by balancing a bridge. We employ a battery operated under precise voltage conditions or a power supply having equivalent characteristics.

The recited method and apparatus result in a bolometer bridge for measuring low level radio frequency power at a low standing wave ratio that is devoid of spurious resonant frequencies in the frequency band from a few thousand cycles to the order of 2.5 gigacycles. (The term "gigacycles" has been accepted as standard nomenclature to replace the term "kilomegacycles." One gigacycle$=10^9$ cycles.)

The dynamic range of power measurement of our bridge is of the order of 47 db; that is, from approximately 0.02 microwatt to 10 milliwatts. At a power level of 12 microwatts the resolution is approximately 0.01 microwatt. With a current meter having an accuracy of 0.2% for indicating the audio frequency power in the substitutional phase of our bridge operation the accuracy of the bridge is approximately 0.4%. With a meter of greater accuracy the accuracy of the power determinations with the bridge is proportionately increased. As will be later detailed a voltmeter may be employed for the readout process. Alternating current voltmeters having an accuracy of 0.05% are available, and this makes the accuracy of the bridge 0.1%. The absolute value of substituted power is accurate to approximately 0.1%, overall, less the calibration factor for the bolometer mount, which factor is separately determinable by a standardizing process and so is known.

This accomplished performance will be recognized by those skilled in the art as several orders better than anything previously known.

An object of our invention is to provide a bolometer bridge having a wide frequency band of operation.

Another object is to provide a bolometer bridge circuit for measuring low power levels of radio frequency energy.

Another object is to provide such a circuit having a high accuracy of measurement.

Another object is to provide such a circuit that is devoid of spurious resonances.

Another object is to employ two radio frequency power-sensing elements to obtain a desirable impedance ratio between the input of the radio frequency power and the arm of the bridge in which said elements are located.

Another object is to provide a bolometer bridge for power measurement that is read out directly in either voltage, current, or according to a decibel scale.

Another object is to provide a bolometer bridge having a large dynamic range of power measurement.

Another object is to provide a bolometer bridge circuit which employs a highly constant voltage source for balancing.

Another object is to provide a bolometer bridge in which significant components are maintained at constant temperature.

Another object is to provide a bolometer bridge circuit in which important changes in the circuit are automatically accomplished in the manipulation from applying radio frequency power of unknown magnitude to evaluating that magnitude.

Another object is to provide a bolometer bridge that is relatively simple and is easy to operate.

Another object is to provide such a bridge relatively devoid of laboratory-like devices.

Other objects will become apparent upon reading the following detailed specification and upon examining the accompanying drawings, in which are set forth by way of illustration and example certain embodiments of our invention.

Figure 1:
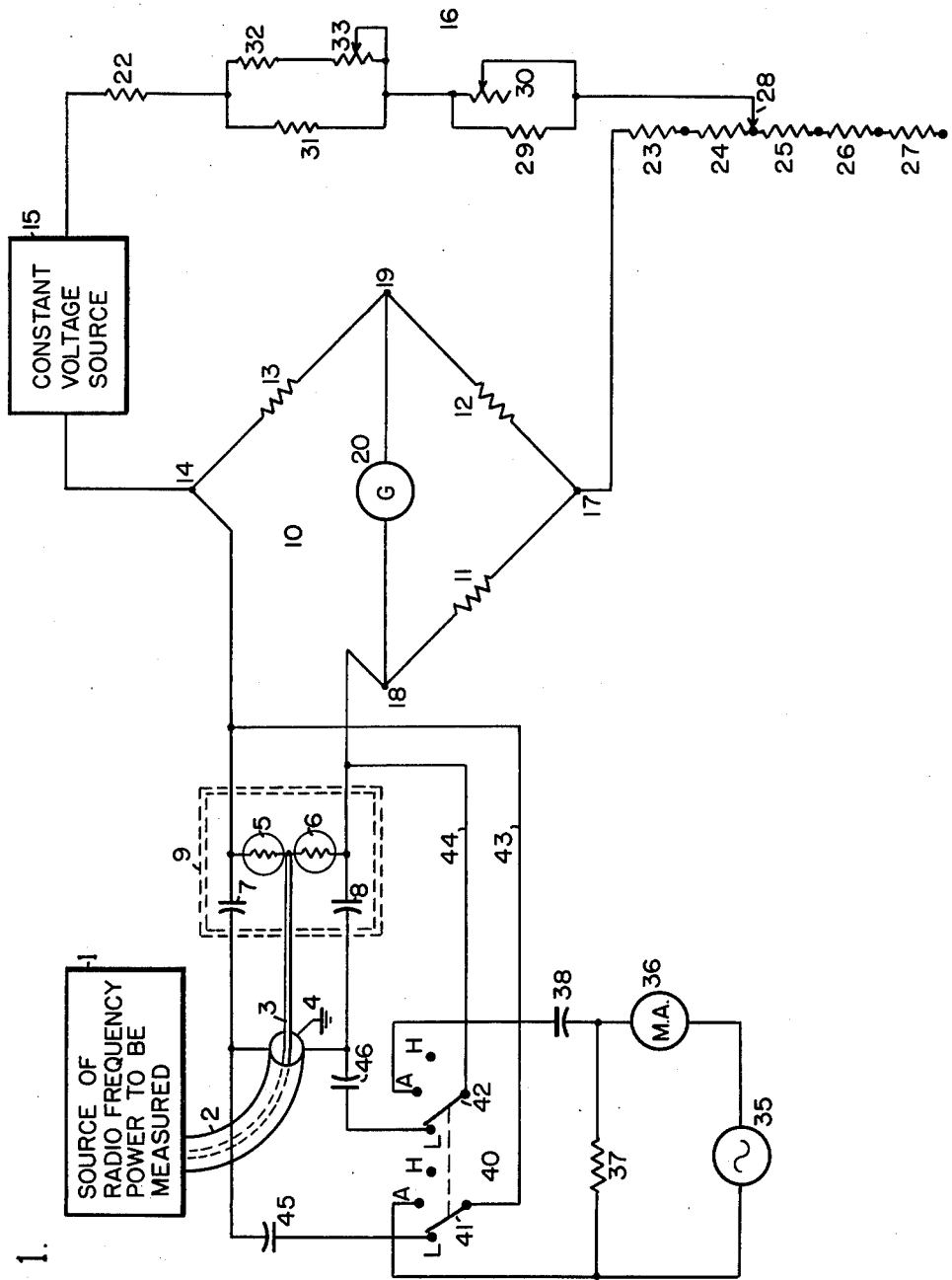
FIG. 1 shows the schematic circuit diagram of our bolometer bridge.

In FIG. 1 numeral 1 indicates a source of radio frequency energy to be measured as to power output. Typically, this is a signal generator to be calibrated, but it may be any type of oscillator or other electrical device supplying a power output at alternating frequency. A typical output impedance for a signal generator is 50 ohms and a typical output connection is of the coaxial type, having an outer hollow conductor 2 and an inner conductor 3. The outer conductor is grounded at 4 and the inner conductor extends to the junction of bolometer elements 5 and 6. Capacitors 7 and 8 connect from the extremities of the series-connected bolometer elements to ground 4. Elements 2 through 8 constitute a "bolometer mount" and the radio frequency connection thereto. The actual physical structure of this mount is subsequently detailed herein and the proportions are not those that may be inferred from the schematic diagram. Ground 4 indicates a common connection of apparatus elements. This connection is normally corrected to earth but this is not essential.

Elements 5 through 8 are enclosed in a contsant temperature oven 9. We prefer to form this oven of two metallic enclosures as indicated, with thermal insulation between. A known thermostatic switch, heater and source of heating current are provided to give an elevated temperature, such as 40° centigrade, with a constancy of 0.01° C. within the oven enclosure. The temperature of the bolometer mount itself is much more nearly constant in the absolute sense of the word, because of the relatively great mass of the mount. The oven is sufficiently large to house significant additional elements in certain embodiments of our invention. Since constant temperature ovens are known per se, our oven is not further detailed.

We prefer to employ a pair of very small thermistors for bolometers 5 and 6. These have a bead length of 0.014" and have 0.001" diameter connecting wires. These are commercially obtainable.

Each of these elements is thus small with respect to the wavelength of the highest frequency in the range to be measured. Thermistors have a large negative temperature coefficient of resistance and this property is employed in making our measurements. The feeble radio frequency power flowing through the thermistors alters their temperature and so their resistance. The type described have a resistance of 100 ohms each when the proper value of D.C. bridge balance current is applied. Errors that would arise from ambient temperature changes are eliminated by our use of the oven. By measuring the change in resistance of the thermistors we are thus able to evaluate the radio frequency power.

Capacitors 7 and 8 have substantially zero reactance at the radio frequencies involved and so the two thermistors 5 and 6 are connected in parallel with respect to the radio frequency power to be measured. Since an output impedance of 50 ohms is typical for devices from which radio frequency power of nominal magnitudes is to be measured it is seen that a desirable impedance match is obtained.

At the same time, a resistance of the order of 200 ohms is a desirable value for each arm of the Wheatstone type bridge 10. It is seen that bolometers 5 and 6 are in series as one arm of this bridge and thus a resistance of 200 ohms is provided. Capacitors 7 and 8 isolate the source 1 from the direct current balance circuit of bridge 10.

Bridge 10 is further composed of resistors 11, 12 and 13, each having a resistance of 200 ohms in the typical embodiment. Junction 14, between resistor 13 and bolometers 5 and 6, is connected to one terminal of constant voltage source 15. The other terminal thereof is connected to an adjustable resistor complex 16, which is employed to adjust the current through the bridge and thereby the resistance of bolometers 5 and 6 to exactly the resistance necessary to balance the bridge. The second terminal of complex 16 connects to terminal 17 of the bridge, this terminal being opposite to terminal 14.

Galvanometer 20 is connected across the opposite junctions 18 and 19 of the bridge. This follows usual Wheatstone bridge practice. This galvanometer may be of the electronic or of the electromechanical types having a sensitivity of at least 100 microvolts (or 0.01 microampere) for a deflection of four inches. The electronic type employs a D.C. amplifier and an indicating meter and may be obtained in high sensitivities.

It is important that the voltage of constant voltage source 15 be truly constant. The heating effect upon thermistors 5 and 6 for microwatts of radio frequency power will be recognized as small. An appreciable variation in the basic balance current supplied by source 15 is seen as sufficient to mask the magnitude of power sought to be measured.

As has been mentioned, a precisely operated battery may be employed for source 15. This takes the form of a lead-acid storage battery of high quality and low internal impedance, such as one containing selenium as an additive element in the construction thereof, which is commercially obtainable from the Olympic Battery Co., of Los Angeles. A battery of twelve cells is desirable, giving a voltage of the order of 28 volts as we operate it.

The battery is fully charged before being initially placed in service. It is maintained in that condition by a very small but constant charging rate. The bridge is also continuously connected to the battery.

While the normal voltage of twelve cells would be 24 volts, under the conditions of full and continuing charge the voltage is constant at a value near 28 volts. The exact value is not critical as long as it is greater than about 25 volts and that the value is strictly constant. The order of voltage stated is required so that the resistance of resistor complex 16 may be in excess of one thousand ohms and thus a negligible shunt across the bridge proper.

Our battery type constant voltage source is very defiintely superior to known arrangements to fill this need for our bridge.

In resistive complex 16, fixed resistor 22 has a resistance slightly in excess of one thousand ohms and is of a constant resistance high quality type. The coarse adjustment resistor is comprised of fixed resistors 23–27, each of equal resistance value such as 7.5 ohms, with a tap switch 28 for including one or more of these resistors in circuit, as desired.

The medium adjustment resistor is comprised of fixed resistor 29, having a resistance of the order of thirty ohms and continuously variable resistor (or rheostat) 30, which may take the form of a three turn device having a maximum resistance of ten ohms.

The fine adjustment resistor is comprised of fixed resistor 31 of five ohms resistance in shunt connection across resistor 32 of ten ohms resistance and rheostat 33 of ten ohms maximum resistance; elements 32 and 33 being connected in series.

All of the three control entities, coarse, medium and fine, of resistor complex 16, are connected in series.

In our precision bridge the A.C. substitution method of measurement is used. Accordingly, a known audio oscillator 35 is employed to provide calibrating energy. This oscillator should be of instrument quality, have constant output and have less than 1% harmonic distortion.

A milliammeter 36, preferably of the thermocouple type, is connected in series with oscillator 35. A center scale of the order of 50 milliamperes is a desirable range.

The current required from the oscillator is generally of this magnitude in known embodiments of our apparatus although this current may have other values in these embodiments and in others. The open (spread apart) characteristic of known thermocouple ammeters at center scale allows accurate adjustment of the current.

Resistor 37 completes a series circuit that includes the oscillator and the meter. The resistance of resistor 37 is approximately one ohm, thus making the voltage across it the same numerical value as the current through it. This is a relatively precision type of non-inductive resistor. The resistance is set at slightly different from one ohm, if necessary, in order to compensate for slight errors. These errors include a non-equivalent heating effect in the thermistors with audio frequency rather than radio frequency alternating electrical energy, so-called "quadrature errors" in the bridge due to the capacitors used therewith and the "calibrating efficiency factor," a factor determined by standardizing measurements upon the bolometer mount. Resistor 37 is preferably made variable to the extent of a small fraction of one ohm to compensate for these errors throughout the life of any particular bridge.

A D.C. blocking capacitor 38 is connected to the junction of the one ohm resistor and the milliammeter. This capacitor has a capacitance of the order of fifty microfarads, a low dissipation factor and high insulation resistance.

Our novel switching arrangement is generally indicated by numeral 40. It is comprised of two mechanically-ganged switch blades 41 and 42. A connection is made from capacitor 38 to the centrally positioned switch contact "A" ("audio") that is coactive with blade 42, and another connection is made from the junction between resistor 37 and oscillator 35 to the "A" contact coactive with blade 41. Since conductors 43 and 44 connect blades 41 and 42 to the bolometer 5, 6 arm of bridge 10 when these blades are in contact with the two "A" contacts, the audio oscillator 35 circuit is connected across the bolometers to enable the substitution measurement to be performed.

When blades 41 and 42 are in contact with the H contacts an open circuit results and the only connection to the bolometers is from the source of radio frequency power to be measured, 1. This is the "high" radio frequency circuit configuration, which extends from slightly more than one megacycle to 2.5 gigacycles in a typical embodiment.

On the other hand, when blades 41 and 42 are in contact with the L contacts, capacitors 45 and 46 are connected in parallel with capacitors 7 and 8, respectively, of the bolometer mount proper. In a typical embodiment capacitors 45 and 46 each have a capacitance of five microfarads. They are of excellent quality in having a low dissipation factor and high insulation resistance. If the radio frequency lower limit were to extend only down into the kilocycle radio range the capacitance of capacitors 45 and 46 could be less than five microfarads, while if the lower limit were to extend into the hundred cycle range the capacitance would have to be greater than five microfarads.

The addition of capacitors 45 and 46 in any event provides the "low" radio frequency circuit configuration. For the five microfarad value this range extends from approximately 3,500 cycles per second to the above-mentioned one megacycle per second, with a degree of overlap between the low and the high radio frequency ranges.

It will be noted that the lower limit of the "low" radio frequency range is well into the usually termed "audio" frequencies and, in fact, is lower than the calibrating frequency of 5,000 cycles per second.

This wide radio frequency range is much to be desired and can only be obtained by removing capacitors 45 and 46 when oscillator 35 is connected in circuit for calibration. Capacitors 45 and 46 provide substantially zero capacitative reactance in the series circuit from radio frequency input 3 through bolometers 5 and 6 to ground. This is necessary and desirable at the low radio frequencies. However, these same capacitors constitute an undesired shunt to ground for the output of calibrating oscillator 35 when it is connected to the bolometers via conductors 43 and 44. By thus removing capacitors 45 and 46 when oscillator 35 is connected the bridge is balanced for calibration at substantially infinite capacitative reactance at the frequency of calibration.

In order to remove any possible confusion in the mind of the reader as to an "audio" frequency also being a "radio" frequency, it can be said that very long wave radio stations for world-wide communication radiate electromagnetic wave energy in the thousands of cycles of alternations per second range and that apparatus for receiving these transmissions and for detecting radio frequency interference extends down to these low frequencies.

Capacitors 7 and 8 are a part of the bolometer mount itself, these having a capacitance each of the order of 0.01 microfarad. This is a sufficiently large capacitance to provide a circuit of substantially zero capacitative reactance at radio frequencies of one megacycle and above and still to constitute a capacitative reactance of substantially infinite value at the 5,000 cycle calibrating frequency (i.e., to have negligible shunting effect).

Not only has the prior art been unable to provide our switched capacitor arrangement but the inherent capacitance of previous mounts has been relatively small. This has been brought about by employing only the classic capacitor structure of two conductive plates with a single dielectric therebetween. This construction has usually restricted the lower frequency limit of the mount to the vicinity of one hundred megacycles. Attempts have been made to add lumped capacitors to the mount capacitors to increase the total capacitance. However, inductance has been introduced into the capacitor structure by the leads to the lumped capacitors, no matter how short these leads have been. This inductance, in turn, has introduced spurious resonances at initially unknown frequencies in the radio frequency spectrum and has been the cause for determining and avoiding these frequencies, as has been previously noted.

We have been able to overcome all of these difficulties by providing a plurality of capacitor plates greater than two in the bolometer mount with a corresponding plurality of interleaved dielectric layers, all within essentially the space occupied by the classical single plate and dielectric. The inductive aspects of our larger capacitor are thus no larger than the inductive aspects of the basic classical capacitor.

Figure 2:
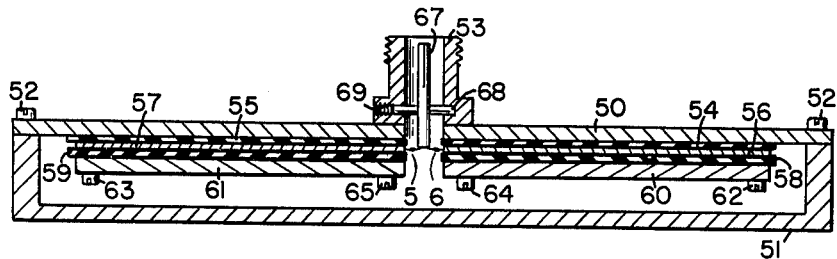
FIG. 2 shows our bolometer mount, on sectional elevation.

Our mount is shown in sectional elevation in FIG. 2. The capacitor plates are semicircular in shape, lying on either side of an axis that divides the left-hand side of the figure from the right-hand side. Thus, capacitor 7 of FIG. 1 is formed on the left in FIG. 2 and capacitor 8 on the right.

The whole bolometer mount structure is formed upon a circular cover plate 50. This plate is housed in a hollow and shallow cylindrical casing 51. The plate and casing may both be formed of brass with silver plating on all current-carrying surfaces. The two are joined by a series of peripherally located cap screws 52, of which two are shown.

Cover plate 50 serves as the grounded left-hand plate for both capacitors 7 and 8 in FIG. 1 and also for supporting the grounded exterior fitting 53 of the coaxial connector for connecting coaxial lead 2. Lying adjacent to plate 50 are semicircular pieces of dielectric 54 and 55, such as pieces of clear mica. Next downwardly adjacent are semicircular plates 56 and 57. These are followed by second pieces of dielectric 58 and 59 and finally by outer capacitor plates 60 and 61. The latter are mechanically and electrically connected to cover plate 50 by a series of peripherally located cap screws, of which 62 and 63 are shown. In addition, two centrally located cap screws 64 and 65 are provided to symmetrically fasten down the stack. The holes for all of the screws 62–65 in the center plates 56 and 57 are oversize so that an electrical connection between these plates and the screws is not made.

In FIG. 2 the layers of dielectric have been shown thicker than actual practice so that the dielectric can be seen and sectioned for insulation. In practice the dielectric is of the order of 0.002″ thick. Similarly, plates 56 and 57 are of the order of 0.010″ thick.

It is seen that a pair of capacitors are formed including two dielectric surfaces each, thus having twice the capacitance of the classical arrangement. We have found this structure desirable while having found the classical structure undesirable. However, following our teaching the stack can be built to greater thickness by including more of the inner plates 56 and 57. The first, third, etc. of such plates are connected together by a preferred means to be later described and form the insulated plates, while cover plate 50, the second, fourth, etc. and plates 60 and 61 form the grounded plates.

The outer cylindrical surface of fitting 53 is formed and threaded to fit the substantially conventional coaxial cable connector upon the end of coaxial cable 2.

We have found that careful attention to the uniformity of the inner bore of fitting 53 is important, but that this has been consistently overlooked by the prior art.

It is necessary, of course, to physically position the central female pin 67 within fitting 53. (A small axial hole in pin 67 receives the male inner contact from the connector previously described.) However, the mechanical and the electrical requirements are at serious cross-purposes here. It has been standard practice heretofore to accomplish this positioning by means of a relatively large cylinder of insulating material bearing upon the inner bore of fitting 53. Furthermore, it has been standard practice to longitudinally secure pin 67 to the insulating cylinder by a C spring washer fitted into a narrow circumferential slot in the pin. This has resulted in an increased diameter of the pin at that point when considered as an electrical structure.

All of the above prior practices have resulted in electrical irregularities in the coaxial fitting and these have produced standing waves on the line at various frequencies, particularly at the upper frequencies in the frequency spectrum passed. Such idiosyncrasies have a direct effect upon the overall accuracy of the bridge measurements and we have taken new steps to remove them.

We have found that a single narrow insulating cylinder 68 placed transverse to the axis of the bore of fitting 53 removes the electrical difficulties mentioned. Cylinder 68 has a smaller diameter than pin 67 and supports the same by a hole through it. The cylinder is made of a superior substance electrically and mechanically, such as Rexolite. The top of pin 67 is formed to constitute a spring female socket by slotting and slightly pressing together the sides of the resulting shell. The male inner contact of the fitting upon the end of cable 2 centers within the female socket of pin 67. Insulating cylinder 68 is inserted transversely into fittnig 53 by an appropriate transverse drill hole. A threaded removable plug 69 allows cylinder 68 to be inserted when removed and holds it in position when in place.

Measurements have shown that the electrical irregularity introduced by our one insulating cylinder 68 is negligible and we enjoy a standing wave ratio of better than 1.12 to 1 over all of our wide frequency band of operation. Mechanically, tight fits at each of the holes holds the pin 67 securely.

The two thermistor bolometers 5 and 6 are welded or soldered between the lower end of central pin 67 and adjacent capacitor plates 56 and 57. These capacitor plates also have external connections 43 and 44 (FIG. 1). These are concerned only with the audio frequency calibrating energy and the low radio frequencies under one megacycle in the connection of auxiliary capacitors 45 and 46. Plates 56 and 57, furthermore, are at the low radio frequency potential end of bolometers 5 and 6 and so the steps we have taken for pin 67, which corresponds to the inner conductor 3 of FIG. 1 are not required for external connections 43 and 44. These connections are both made through one double pin type usual A–N connector. This has not been shown in FIG. 2 for sake of clarity.

The connections between the plurality of thin plates 56, 57, if more than one of these plates is employed for each capacitor, is effected by merely soldering or otherwise electrically connecting each such thin plate to one of the two insulated pin contacts of the A–N connector. The pin contacts passing through holes in the thin plates. By this construction unwanted inductance due to connecting wires is minimized.

Figure 3:
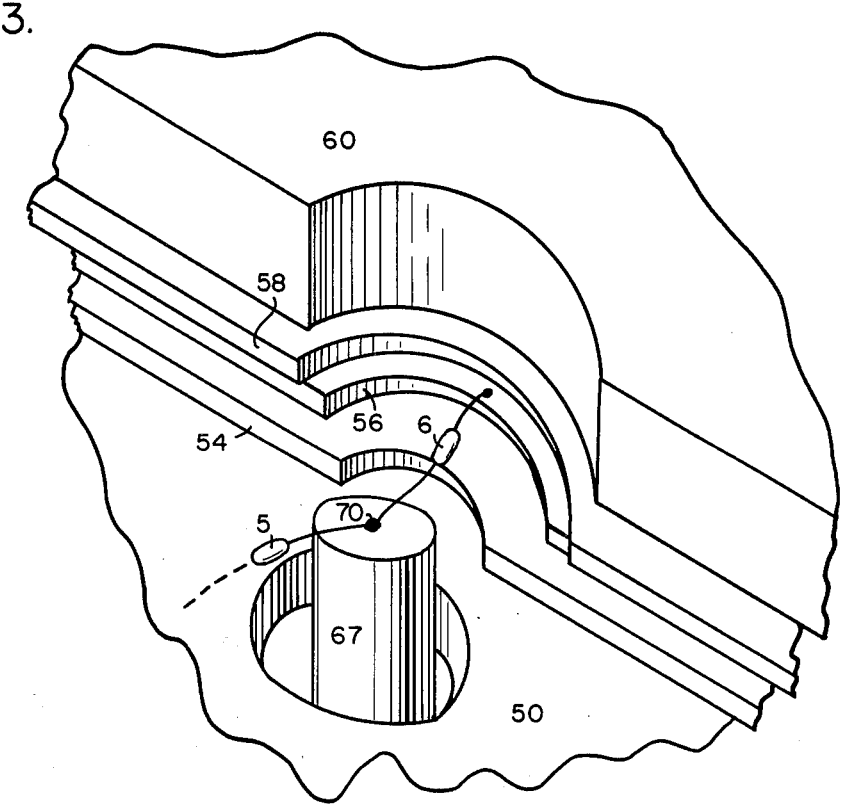
FIG. 3 shows significant details of the bolometer mount in perspective.

The detail adjacent to the thermistors is shown in the much enlarged perspective view of FIG. 3. In practice, the thermistors are so small that a magnifying glass is required for manipulating them. FIG. 3 represents a fragmentary view of one side of FIG. 2 with the cover plate 50 inverted and casing 51 removed, as this part of the mount appears when thus partially disassembled. The left-hand group of capacitor elements in FIG. 2 have been eliminated in FIG. 3 so that one group can be clearly seen. The left-hand group is a mirror image of the group shown.

In FIG. 3 the incoming radio frequency energy arrives upon pin 67, with cover plate 50 constituting the ground return path (including the outer sheath of coaxial cable 2 of FIG. 1). One of each of the terminal leads of thermistors 5 and 6, or the leads of other bolometers that might be used instead, are welded or soldered to a common point 70 at the center of pin 67. The other lead of thermistor 6 is welded or soldered to center capacitor plate 56 and so also for thermistor 5 to plate 57, although it is not shown in FIG. 3 for reasons previously stated. Dielectric 54 is seen separating plate 56 from cover plate 50 and dielectric 58 separating plate 56 from the (thicker) end plate 60.

Thermistors 5 and 6 and the complete mount bounded by elements 50 and 51 are permanently within constant temperature oven 9. When constant voltage source 15 is the power supply referred-to it is also desirable to have the final voltage-regulating stage thereof within the oven for obtaining the very precise voltage control desired. Resistors 11–13 of the bridge and the resistors of complex 16 are chosen of the commercially obtainable temperature insensitive type and are not required to be within the oven.

Our bridge apparatus is operated as follows. After a suitable "warm-up" period to insure electrical stability and with all connections completed according to FIG. 1, switch 40 is placed at L if the frequency of the radio power to be measured is less than 1.2 megacycles and to H if it is greater than this frequency. Using the controls of resistor complex 16 the bridge is balanced with the radio frequency energy applied. The radio frequency source 1 is then turned off and simultaneously switch 40 is switched to A. If these operations are performed together, galvanometer 20 will not swing substantially from the null value and time is saved in obtaining the new galvanometer reading.

The bridge is again balanced, now with the audio frequency energy; the output of oscillator 35 being varied as required. The magnitude of the audio frequency current is read from meter 36.

The unknown power of the radio frequency source is calculated from the final equation following, which is derived as follows:

Let $P$=power, $E$=voltage, $I$=current, $R$=resistance and let the subscripts $rf$ denote radio frequency and $af$ denote audio frequency.

By the method of measurement $P_{rf}=P_{af}$
From fundamentals $$P_{rf}=\frac{E_{rf}^2}{R_{rf}}$$

From the construction of the apparatus $R_{rf}=50$ ohms
From fundamentals $$P_{af}=\frac{E_{af}^2}{Raf}$$

From the construction of the apparatus $R_{af}=200$ ohms
Substituting and equating $$\frac{E_{rf}^2}{50}=\frac{E_{af}^2}{200}$$

Taking the square root $$E_{rf}=\frac{E_{af}}{2}$$

From fundamentals
$$E_{af}=I_{af}R_{37} \qquad R_{37}=1 \text{ ohm}$$
and
$$E_{af}=I_{af}$$
Substituting $$E_{rf}=\frac{I_{af}}{2}$$

(A)

Substituting $$P_{rf}=\frac{I_{af}^2}{200}$$

(B)

In practice either the radio frequency voltage from Equation (A) or the radio frequency power from Equation (B) may be of interest.

The use of milliammeter 36 will be recognized as a complete and valid means of readout. However, if this meter is replaced by a 5 ohm non-inductive resistor the audio frequency voltage across this resistor is ten times the radio frequency voltage that was impressed upon the bridge. The audio frequency voltage can be read on a known vacuum tube voltmeter. Similarly, a 50 ohm resistor in place of the meter gives a one hundred times voltage multiplier. The factor of two enters because of the mathematics defining the situation, as given directly above.

It is also possible to make the resistor 1.737 ohms, in which case the audio frequency voltage is proportional to the radio frequency voltage on a decibel basis. A voltage of 0.775 volt=0 dbm at 600 ohms. The voltmeter scale is then laid out logarithmically to give decibels.

We have set forth certain novel aspects comprising our method and apparatus for accomplishing significant improvement in the art of measuring radio frequency power, particularly at low power levels.

However, particularly in the general aspects of our apparatus, various modifications in the characteristics of the circuit elements, details of circuit connections and the coactive relation between the elements may be taken without departing from the scope of our invention. Modifications may also be made in the arrangement, size and proportions of elements of our apparatus without departing from the scope of our invention.

Having thus fully described our invention and the manner in which it is to be practiced, we claim:

1. The method of measuring feeble electrical energy of low radio frequency which comprises the steps of:
    (a) applying said radio frequency electrical energy across an arm of a resistive bridge,
    (b) providing substantially zero capacitative reactance to said radio frequency electrical energy at said arm of said bridge,
    (c) balancing said bridge by varying adjustment of a voltage source applied across said bridge,
    (d) substitutionally applying audio frequency electrical energy directly across only the same said arm of said bridge,
    (e) substitutionally providing substantially infinite capacitative reactance to said audio frequency electrical energy at the same said arm of said bridge,
    (f) again balancing said bridge by varying only the said audio frequency signal with said voltage source in its adjusted position, and
    (g) measuring the amplitude of said audio frequency electrical energy required to again balance said bridge.

2. A bridge circuit for measuring radio frequency electrical power comprising
    a twin bolometer having one central and two extremity connections and a mounting having a central conductor, the central connection of said twin bolometer connected to said central conductor,
    said mounting having only plural capacitor plates in capacitative relation to said mounting and connected to each extremity connection of said twin bolometer within said mounting,
    a bridge circuit including said twin bolometer in one arm thereof,
    means including a constant voltage source to null said bridge with said radio frequency electrical power applied to said twin bolometer, means including said constant voltage source and an audio frequency source of adjustable amplitude to substitutionally null said bridge with audio frequency electrical power directly applied across only said twin bolometer and with said constant voltage source having the same null relation to said bridge as when said radio frequency electrical power was applied to said twin bolometer, means to measure the adjusted said amplitude of the output of said audio frequency source,
    an additional pair of capacitors having low capacitative reactance at low radio frequencies and switching means connected across said plural capacitor plates and to said additional pair of capacitors to connect said plates and said capacitors in parallel only when said low radio frequencies of electrical power are applied to said twin bolometer.

3. A bridge circuit for measuring radio frequency electrical energy comprising
    a dual thermistor bolometer mount having a central conductor to which one terminal of each of the two thermistors is connected, two groups of plural capacitor plates in capacitative relation to said mount and connected to each other terminal of each thermistor such that the length of the connection is a fraction of a wavelength of the highest said radio frequency measured, a bridge circuit including said thermistors in one arm thereof, means to null said bridge with said radio frequency electrical energy applied to said thermistors, an audio frequency oscillator to substitutionally null said bridge with audio frequency electrical energy applied directly across only said thermistors and with said means to null said bridge having the same adjustment as when said radio frequency electrical energy was applied to said thermistors,
    means to measure said audio frequency electrical energy connected to said audio frequency oscillator to measure the said audio frequency electrical energy required to substitutionally null said bridge,
    a pair of capacitors, each having a very large capacitance with respect to the capacitance of said capacitor plates,
    and switching means connected to said groups of capacitor plates and to said pair of capacitors, respectively,
    and also to said audio frequency oscillator, to connect said plates and said capacitors in parallel only when selected low frequencies of said radio frequency electrical energy is applied to said thermistors.

4. A bridge circuit for measuring radio frequency electrical energy comprising
   a dual bolometer mount having two distinct groups of plural capacitor plates,
   said plates connected, respectively, to the bolometers and to said mount,
   a bridge circuit including said bolometers,
   direct current means to balance said bridge with said radio frequency electrical energy applied to said bolometers,
   an audio frequency source and circuit including resistive and audio frequency measurement means to substitutionally balance said bridge with audio frequency electrical energy applied directly to said bolometers,
   a pair of capacitors each having a capacitance many times greater than the capacitance of each of said two groups of plates, and switching means having two ganged arms and three pairs of contacts, said arms connected, respectively, to said two groups of capacitor plates,
   a first pair of contacts connected to said pair of capacitors to connect said plates and said capacitors in parallel at selected low frequency values of said radio frequency electrical energy,
   a second pair of contacts connected only to the circuit of said audio frequency source for said substitutional balancing, and a third pair of contacts unconnected for removing said pair of capacitors at frequency values of said radio frequency electrical energy greater than said selected low frequency values.

5. A bolometer bridge circuit for measuring feeble radio frequency electrical energy over a wide frequency spectrum extending from the kilocycle to the gigacycle regions comprising
   a pair of bolometers small with respect to the wavelength of the highest frequency within said wide frequency spectrum,
   a metallic mount enclosing said bolometers,
   a conductor centrally located within said mount spaced and insulated therefrom by a single transverse insulating element which passes through said central conductor,
   one terminal of each of said bolometers connected to said conductor,
   pairs of plural conductive plates disposed within said mount with dielectric interleaved between said plural plates with one plate of each pair connected to said mount,
   the other terminal of each of said bolometers connected to at least one insulated plate of one pair of said pairs of plural plates,
   a constant temperature oven surrounding said mount,
   means to introduce said feeble radio frequency energy between said conductor and said mount, a resistive bridge,
   means to connect said bridge to said bolometers to form an arm of said bridge,
   means to balance said bridge with said feeble radio frequency energy applied to said bolometers,
   and to substitutionally balance said bridge with audio frequency energy applied directly to said bolometers in the absence of said feeble radio frequency energy,
   measuring means to measure said audio frequency energy required to substitutionally balance said bridge,
   an additional pair of capacitors,
   and switching means to connect said additional pair of capacitors to greatly augment the capacitance of said plural plates by connecting each of said additional pair of capacitors in parallel with one of said pairs of conductive plates at the lower frequencies of said radio spectrum,
   and to remove said additional pair of capacitors from the electrical circuit when said audio frequency energy is substitutionally applied to said bolometers.

6. A bridge for measuring radio frequency electrical energy over a continuous wide frequency spectrum comprising
   a pair of thermistors,
   a metallic mount enclosing said thermistors,
   a conductor located within said mount and insulated therefrom by single insulating means transversely disposed with respect to said conductor and having a cross-sectional dimension smaller than that of said conductor,
   each of said thermistors connected to said conductor,
   two groups of conductive plates disposed within said mount with insulating means interleaved between said plates and between said plates and said mount,
   each of said thermistors connected to at least one thus insulated plate of one said group oppositely to the connection of said thermistors to said conductor,
   means to introduce said radio frequency energy between said conductor and said mount,
   an electrical bridge having three arms,
   means to connect said thermistors to form the fourth arm of said bridge,
   means to null said bridge with said radio frequency energy applied to said thermistors,
   and to substitutionally null said bridge with audio frequency energy directly applied to said thermistors in the absence of said radio frequency energy,
   means to measure said audio frequency energy required to substitutionally null said bridge,
   an additional pair of capacitors,
   and switching means having plural positions,
   said switching means connected to said groups of plates and to said additional pair of capacitors to augment in one switch position the capacitance connected to each of said thermistors by placing a said additional capacitor in parallel with each group of said conductive plates at the lower frequencies in said radio frequency spectrum, said switching means constituted to remove said additional pair of capacitors from the parallel connection in another switch position, when said audio frequency energy is substitutionally applied to said thermistors.

7. A bridge circuit for measuring radio frequency electrical energy over a frequency spectrum comprising
   a pair of bolometers small with respect to the wavelength of the highest frequency within said frequency spectrum,
   a conductive mount enclosing said bolometers,
   a conductor located within said mount and insulated therefrom by a single small insulating cylinder transversely disposed with respect to said conductor, one terminal of each of said bolometers connected to said conductor, pairs of plural conductive plates disposed within said mount with insulating means between each of said plates, each of said bolometers connected to at least one insulated plate of one pair of said pairs of plural plates,
   means to introduce said radio frequency energy between said conductor and said mount, a bridge having plural arms,
   means to connect said bolometers to form an arm of said bridge,
   means including a constant voltage source to null said bridge with said radio frequency energy applied to said bolometers,
   means including said constant voltage source to substitutionally null said bridge with audio frequency energy applied directly to said bolometers in series in the absence of said radio frequency energy,
   means to measure the level of said audio frequency energy required to substitutionally null said bridge,
   and an additional pair of capacitors, and switching means having plural positions connected to said pairs of plates and to said additional pair of capacitors to augment in one switch position the capacitance connected to each of said bolometers by placing a said additional capacitor in parallel with each of said pairs of plates at the lower frequencies in said radio frequency spectrum, said switching means constituted to remove said additional pair of capacitors in another switch position when said audio frequency energy is substitutionally applied to said bolometers to null said bridge.

8. A bolometer bridge circuit for measuring feeble radio frequency electrical energy over a wide frequency spectrum comprising a pair of thermistors very small with respect to the wavelength of the highest frequency within said wide frequency spectrum, a metallic mount enclosing said thermistors, a conductor centrally located within said mount spaced and insulated therefrom by a single small transverse insulating cylinder, one terminal of each of said thermistors connected to said conductor, two groups of plural conductive plates disposed within said mount and insulating means interleaved between each of said plural plates, at least one plate of each group electrically connected to the mount, the other terminal of each of said thermistors connected to at least one insulated plate of one said group of plates, means to introduce said feeble radio frequency energy between said conductor and said mount and thereby to said pair of thermistors in parallel, a resistive bridge having three arms, means to connect said bridge to said thermistors in series to form the fourth arm of said bridge, means including a constant voltage source to balance said bridge with said feeble radio frequency energy applied thereto, means including said constant voltage source to substitutionally balance said bridge with audio frequency energy applied only to said pair of thermistors in the absence of said feeble radio frequency energy, means to measure the level of said audio frequency energy required to substitutionally balance said bridge, an additional pair of capacitors, and switching means having plural contact positions, said switching means connected to said groups of plates and to said additional pair of capacitors to augment in one switch position the capacitance connected to said thermistors by placing a said additional capacitor in parallel with each of said conductive plates groups to provide small capacitative reactance at the lowest frequency in said radio frequency spectrum, said switching means constituted to remove said additional pair of capacitors in another switch position when said audio frequency energy is substitutionally applied to said pair of thermistors to balance said bridge.

References Cited by the Examiner
UNITED STATES PATENTS

| | | | |
|---|---|---|---|
| 2,399,481 | 4/46 | George | 324—106 |
| 2,617,843 | 11/52 | Houghton | 324—95 |
| 2,887,655 | 5/59 | Jaffe | 324—106 |

WALTER L. CARLSON, *Primary Examiner.*